United States Patent [19]

Fields, Jr.

[11] Patent Number: 4,691,445
[45] Date of Patent: Sep. 8, 1987

[54] HORIZONTAL EVALUATION DATUM SCOPE

[76] Inventor: Loranza D. Fields, Jr., P.O. Box 1181, Chicago, Ill. 60126

[21] Appl. No.: 792,539

[22] Filed: Oct. 29, 1985

[51] Int. Cl.$^4$ .............................................. G01C 5/04
[52] U.S. Cl. ................................... 33/367; 33/147 C
[58] Field of Search ............................. 33/367, 147 C

[56] References Cited

U.S. PATENT DOCUMENTS

| | | | |
|---|---|---|---|
| 2,814,127 | 11/1957 | Blatchford | 33/367 |
| 3,651,581 | 3/1972 | Lehman | 33/367 |

FOREIGN PATENT DOCUMENTS

| | | | |
|---|---|---|---|
| 127155 | 1/1950 | Sweden | 33/367 |
| 272304 | 3/1951 | Switzerland | 33/367 |
| 672312 | 7/1979 | U.S.S.R. | 33/367 |

*Primary Examiner*—Willis Little
*Attorney, Agent, or Firm*—Jones & Askew

[57] ABSTRACT

An instrument for establishing a horizontal plane for leveling ceilings, tables, floors and the like, consisting of a reference head having a translucent liquid reservoir, an adjustable field head, and a hose for interconnecting the two heads. With the level of liquid in the reservoir calibrated to correspond to the desired elevation, the liquid level at the field head at the other end of the hose will correspond to the selected reference level, thereby providing a means for defining a horizontal plane which is independent of a continuous line of sight. A plurality of datum scales in visual juxtaposition with the reference head reservoir and correlated to the mounting channel or to the base of the reference head provide reference marks at known vertical distances from these mounting points.

7 Claims, 4 Drawing Figures

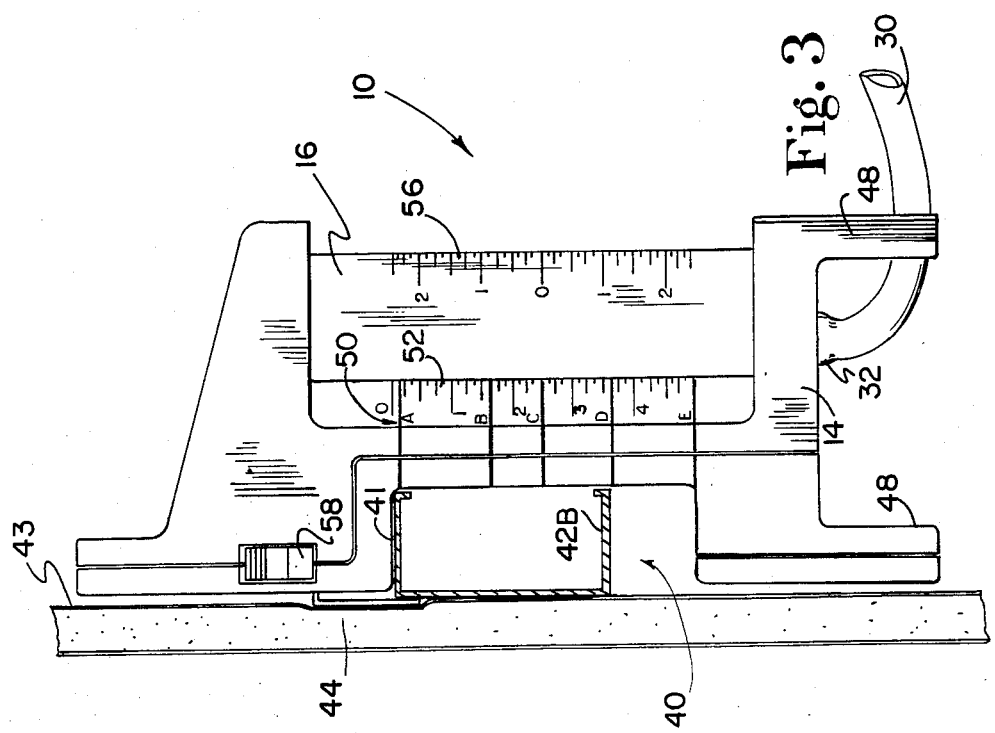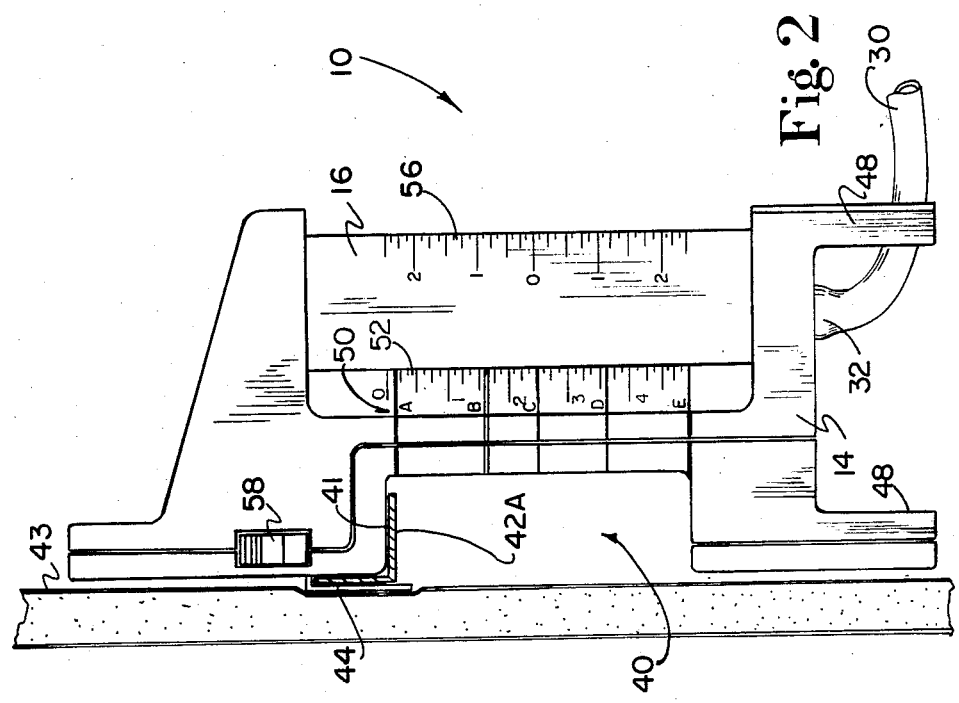

HORIZONTAL EVALUATION DATUM SCOPE

TECHNICAL FIELD

This invention relates generally to instruments for determining levels, and relates more specifically to an instrument which can determine levels independently of a continuous line of sight and which can be used by a single operator.

BACKGROUND OF THE INVENTION

Instruments for checking and determining levels and differences in elevation for such jobs as hanging ceilings, leveling floors and walls, laying out building interiors, and the like are well known in the art. Perhaps the best known such device is the transit, which can be used to determine levels by providing a planar line of sight. The transit is set up so that the scope is rotatable in a horizontal plane. A first operator then sights through the transit, usually at a leveling rod and target, and instructs a second person to move the rod up or down on the desired surface until the target corresponds to the planar level sighted through the transit. Such a device is limited to applications where there is an uninterrupted line of sight between the elements which are to be leveled. A transit cannot be used where the surfaces which are to be leveled are in different rooms, for example, whereby walls prevent the transit from sighting both objects from a single location. Further, a transit requires at least two persons to operate: one to sight through the transit, and the other to man the leveling rod.

Accordingly, there is a need to provide a leveling instrument which can check and determine levels and differences in elevation which can be operated by a single person and independently of a continuous line of sight.

A more sophisticated apparatus for creating a plane for determining a proper level for hanging ceilings and the like consists of a rotating source of light such as a laser. By setting up the device so that the beam of light rotates in the desired plane, a horizontal line of light is reflected onto the surrounding surfaces corresponding to the desired level. Such devices suffer the aforementioned limitation requiring a continuous line of sight between the light source and the elements which are being leveled. Further, such devices are expensive and relatively delicate instruments which are ill-suited for many construction site environments.

Accordingly, there is a need to provide a leveling instrument which is rugged, inexpensive to manufacture, and requires no special skills on the part of the user.

SUMMARY OF THE INVENTION

The leveling instrument of the present invention overcomes these and other disadvantages associated with prior art leveling instruments. Stated generally, the leveling instrument of the present invention comprises an instrument for determining horizontal levels and differences in elevation which can be operated by one person and which can be used where a continuous line of sight between the instrument and the locations at which a level is to be determined is unavailable.

Stated somewhat more specifically, the leveling instrument of the present invention comprises a liquid level having a reference head and a field head, each having translucent liquid-containing reservoirs and having reference marks inscribed thereon. The reservoirs are connected by a hose of indeterminate length and are both open to the atmosphere. The instrument is filled with an amount of water or other appropriate liquid sufficient to fill the hose and to fill both reservoirs to their respective reference marks. The reference head is secured to the reference structure so that the reference mark inscribed on the head corresponds to the desired level. Since the atmosphere pressure is the same at both heads, the column of water which the atmosphere will support at one end of the leveling instrument is the same height as the column of water which will be supported at the other end. The operator adjusts the field head on the structure upon which a level is desired to be determined until the level of water in the field head reservoir corresponds to the reference mark inscribed on the field head. Since the height of the column of water at both ends of the leveling instrument is the same, and since the column of water at the reference head corresponds to the desired level, the reference mark on the field head will indicate the desired level.

Thus, it is an object of the present invention to provide an apparatus for checking and determining levels and differences in elevation for such jobs as hanging ceilings, leveling floors and walls, laying out building interiors, and the like which is operable in situations where a continuous line of sight between the leveling instrument and the locations at which a level is to be determined is unavailable.

It is a further object of this invention to provide such a leveling instrument which can be operated by a single person.

It is another object of the present invention to provide a leveling device which is inexpensive to manufacture.

Another object of the present invention is to provide a leveling instrument which requires no special skills to operate.

It is yet another object of the present invention to provide a leveling instrument which does not require extensive calibration and which can survive the rigors of a construction site environment.

Other objects, features, and advantages of the present invention will become apparent upon reading the following specifications when taken in conjunction with the drawing and the appended claims.

BRIEF DESCRIPTION OF THE DRAWING

FIGS. 2 and 3 are side views of the leveling instrument of the present invention secured to different mounting structures to show how the various reference marks are used for different applications.

DETAILED DESCRIPTION OF THE DISCLOSED EMBODIMENT

Figure 1:
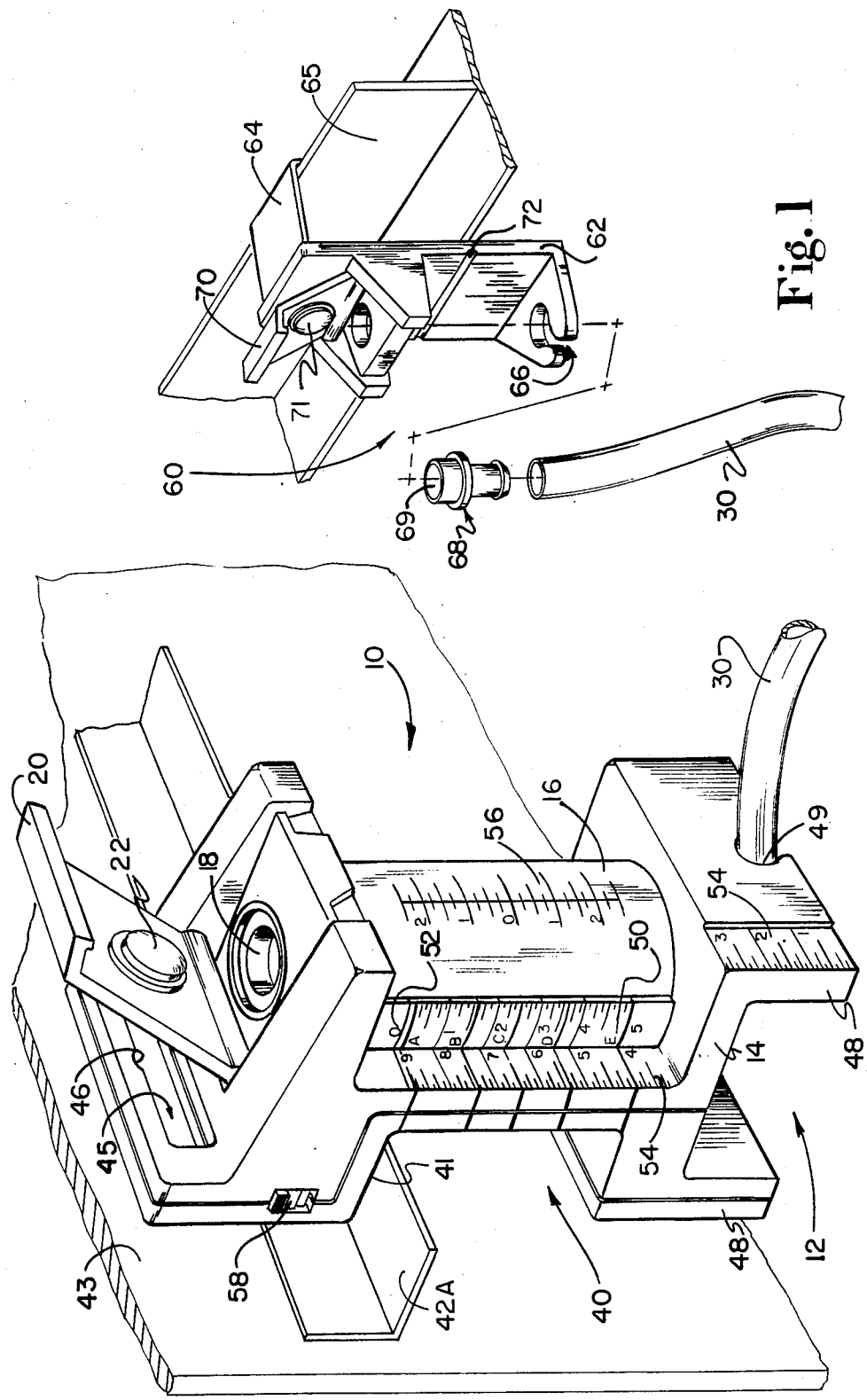
FIG. 1 is a pictorial view of the leveling instrument of the present invention.

Referring now in more detail to the drawing, in which like numerals indicate like elements throughout the several views, FIG. 1 shows a horizontal reference indicator 10 including a reference head 12. The reference head has a housing 14 substantially enclosing a translucent reservoir 16 of plastic or other suitable material. The reference head reservoir of the preferred embodiment is a cylinder approximately 2.5 inches in diameter. However, it will be appreciated by those skilled in the art that reservoirs of a different size or shape can be employed, subject to the restrictions hereinafter set forth.

The upper end of the reference head reservoir 16 has an aperture 18 formed therein which serves a dual purpose: it provides access to the interior of the reservoir for adding a suitable liquid such as water to calibrate the leveling instrument, and it provides a means for venting the reservoir to the atmosphere during use. A hinged flap 20 mounted on the top of the housing 14 has a plug 22 formed on its inner surface and disposed when the flap is closed to seal the aperture 18 in the upper end of the reservoir 16 to prevent the liquid in the reservoir from spilling when the instrument is not in use.

One end of a flexible clear plastic tubing 30 is attached to a nipple 32 formed in the lower end of the reference head reservoir 16 in a suitable manner to communicate with the interior of the reservoir. The tubing of the disclosed embodiment is approximately 0.25 inches in inner diameter and approximately one hundred feet in length, but it will be appreciated by those skilled in the art that tubing of different inner diameter or of different length can be employed without departing from the scope and spirit of the appended claims.

A channel 40 formed in the back of the housing 14 and having an upper wall 41 at its upper end is of suitable dimensions whereby the reference head 12 may be hung on a workpiece, for example a wall molding 42A secured to a wall 43 as shown in FIG. 2, or a stud 42B secured to a wall 43 as shown in FIG. 3. A selectively detachable hool 44 extends downwardly between the wall 43 and the workpiece 42A, 42B to prevent the reference head 12 from falling off.

A carrying handle 45 formed in the upper end of the housing 14 provides a convenient means for transporting the device, and a hole 46 formed in the handle provides a means for attaching the reference head 12 to a wall or other surface with a screw or nail. A base 48 formed in the lower end of the housing permits the reference head 12 to stand on any suitable surface. The bottom of the reservoir 16 is recessed a short distance from the base 48 of the housing 14 to provide space for the flexible plastic tube 30 to bend smoothly from the nipple 32 to extend out the front of the housing when the housing rests on its base through a recess 49 formed in the lower face of the housing.

Adjacent the exposed surface of the reservoir 16 are a plurality of datum reference scales 50, 52, 54, and 56. Datum scale 50 is correlated with the upper wall 41 of the channel 40 and is calibrated to provide reference marks A-E at distances below the upper channel wall corresponding to the thickness of various studs and wall moldings with which the horizontal reference indicator 10 is commonly used. Reference mark A is 0.125 inches below the upper channel wall 41, reference mark B is 1.625 inches below the upper channel wall, reference mark C is 2.5 inches below the upper channel wall, reference mark D is 3.625 inches below the upper channel wall, and reference mark D is 5 inches below the upper channel wall. Datum scale 52 is correlated with the upper channel wall 41 to provide reference marks calibrated in inches downwardly therefrom. Datum scale 54 is correlated with the base 48 to provide reference marks calibrated in inches upwardly from the base. Datum scale 56 is correlated with the center of the reservoir 16 and provides reference marks calibrated in inches above and below the center of the reservoir.

Since construction sites are often poorly lit, the disclosed embodiment includes one or more battery powered lights (not shown) installed within the housing 14 adjacent to the translucent reservoir 16. Thus, by actuating a switch 58, a user can light the interior of the reservoir to more easily read the level of the liquid contained therein.

Attached to the opposite end of the tubing 30 is a field head 60. As shown in FIG. 1, the field head includes a frame 62 having an adjustable hook 64 attached thereto by an adjusting screw (not shown) and adapted to engage, for example, a T-bar 65 for hanging ceilings. A clamp 66 formed in the bottom of the frame 62 and a hose connector 68 which fits into the top of the frame maintain the tubing in place. A port 69 formed in the top of the frame coaxially with the hose connector 68 provides a vent for the tube 30. A hinged flap 70 on the top of the frame 62 has a plug 71 formed on the bottom thereof disposed when the flap is closed to seal the port 69 to prevent liquid from leaking out the end of the tube. When the flap is opened, the tube is vented to the ambient. A datum plane line 72 is inscribed on the housing at an intermediate point on the frame 62.

It will be appreciated that the field head 60 of the present invention utilizes the end of the clear plastic tube 30 as a reservoir. However, a separate translucent reservoir in communication with the tube 30 may be mounted on the field head without departing from the scope and spirit of the appended claims.

To operate the leveling instrument 10 of the present invention, the instrument must first be calibrated. The reservoir 16 and tubing 30 are filled with an appropriate fluid such as water by raising the hinged flap 20 to access the aperture 18 in the top of the reservoir and then adding fluid into the reservoir. To determine the proper amount of fluid to be added to the leveling instrument, a reference mark on the reference head datum scales 50, 52, 54, or 56 appropriate to the particular application is selected. For example, when it is desired to define a horizontal plane to hang a ceiling at a level corresponding to the bottom of a workpiece, the reference mark A-E of datum scale 50 is selected which corresponds to the bottom of the workpiece when the reference head 12 is hung on the workpiece. As shown in FIGS. 2 and 3, workpieces of different dimensions require selection of different reference marks on the datum scale 50. To fill the reservoir 16 and tube 30 with liquid, the reference head 12 and field head 60 are preferably placed side by side with the field head datum plane line 72 at a height corresponding to the selected reference mark A-E on the reference head datum scale 50. In the event the workpiece is of non-standard dimensions such that the bottom of the workpiece does not correspond to any of the reference marks A-E on the datum scale 50, a measurement on the datum scale 52 can be selected to correspond to the bottom of the workpiece. Fluid is then added until the fluid level corresponds to the selected reference marks. To facilitate reading of the fluid level, it may be desirable to add a coloring agent to the fluid or to use a colored liquid. Also, to avoid freezing of the fluid and possible damage to the instrument, it may be desirable to employ a liquid, such as antifreeze, which has a very low freeze point.

To use the leveling instrument to determine a level, the reference head 12 with fluid-filled reservoir 16 is attached to the workpiece which is to serve as the reference elevation. For example, the reference head 12 can be attached to a workpiece such as a molding 42A or stud 42B by hanging the head on the workpiece such that the upper wall 41 of the channel 40 rests on the workpiece. Alternatively, a nail (not shown) can be driven into the wall and the reference head 12 hung on the nail such that the hole 46 in the handle 45 engages the nail.

With the reference head 12 in place and the appropriate reference mark on the reference head datum scale 50, 52, 54, or 56 selected to define the reference elevation, the flaps 20, 70 in the tops of the reference head housing 14 and the field head frame 62 are opened to vent both ends of the unit to the ambient. The field head 60 is then placed adjacent to the object surface upon which a level is to be determined, and the elevation of the field head is adjusted until the fluid level in the tube at the field head corresponds to the datum plane line. Since the level of the fluid in the field head 60 is at the same elevation as the level of the fluid in the reference head 12, and since the level of fluid in the reference head corresponds to the desired elevation when the liquid level at the field head corresponds to the datum plane reference mark, the datum plane reference mark indicates the proper reference elevation on the object surface. The reference head 12 may be left in place while the field head 60 is moved to other object surfaces to mark the desired plane at several locations around the room. It will be appreciated that the reference head once installed can be left unattended so that one person can unassistedly operate the leveling instrument.

Typically, suspended ceilings are installed using what are known as T-bars 65. To determine the proper level for these T-bars, the reference head 12 is installed on a workpiece at the desired elevation as hereinbefore described. The field head 60 is then hung directly onto the T-bar 65 being leveled and the hook 64 adjusted relative to the field head frame 62 by means of its adjustment screw so that the bottom of the T-bar corresponds to the datum plane line 72. The user then simply raises or lowers the T-bar 65 until the liquid level in the tubing 30 corresponds to the datum plane line, and the user secures the bar at that height. In this manner, the bottom of the T-bar 65 is positioned at a height corresponding to the bottom of the workpiece upon which the reference head is mounted.

Figure 4:
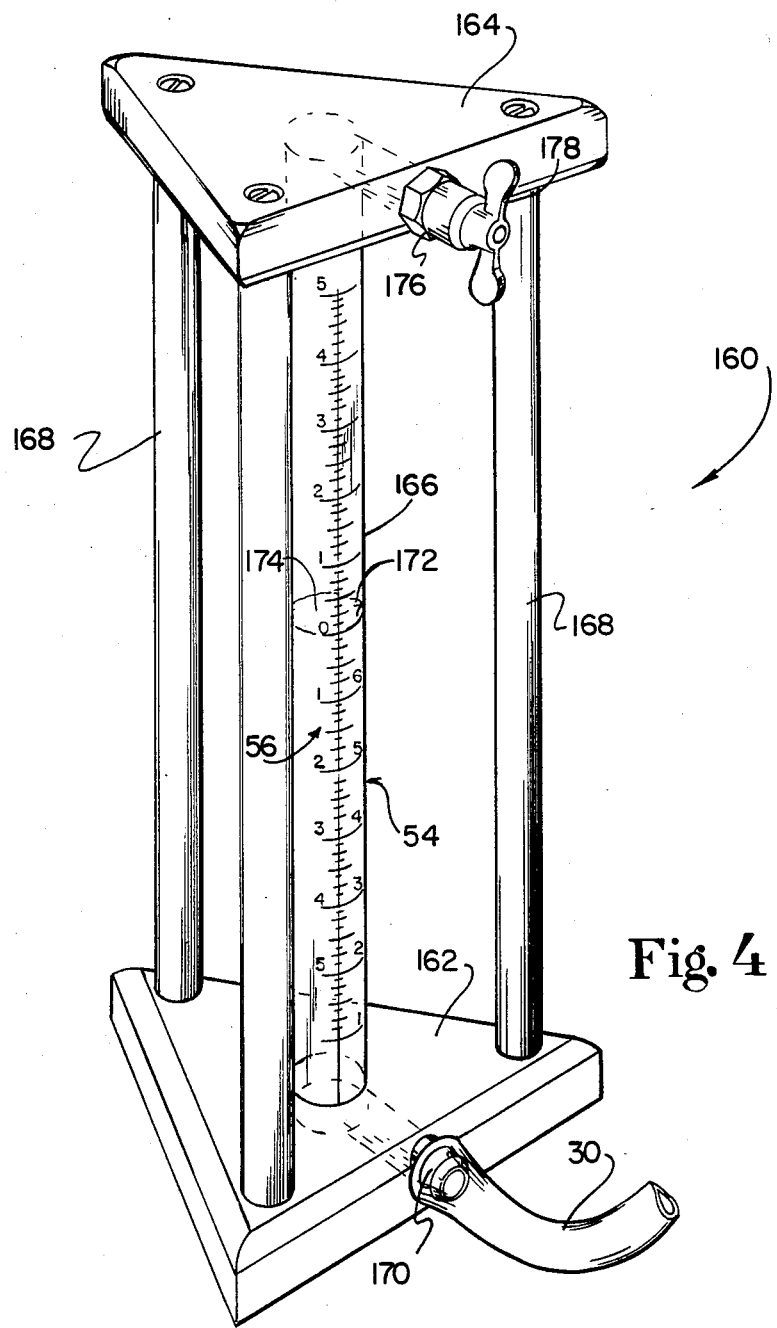
FIG. 4 is a pictorial view of an alternate field head for use with the leveling instrument of the presetn invention.

FIG. 4 shows an alternate embodiment of a field head 160 for use in leveling flat surfaces such as floors, coutertops, tables, and the like. The tabletop field head 160 comprises a base 162, a top 164, a translucent plexiglass tube 166 comprising a reservoir interposed therebetween, and a plurality of legs 168 interconnecting the base and top and surrounding the plexiglass tube. One end of the plastic tubing 30 connects to the plexiglass tube 166 by means of a fitting 170 at the base thereof. A plurality of datum scales 172, 174 corresponding to datum scales 54, 56 on the reference head 12 are inscribed in visual juxtaposition to the plexiglass tube 166. A vent 176 in communication with the top of the plexiglass tube 166 can be opened by means of a thumbscrew 178 to vent the tube to the atmosphere or closed to prevent liquid from spilling when not in use.

To use the horizontal reference indicator 10 to level the top of a planar work surface, such as a table, counter, or floor, the tabletop field head 160 is connected to the reference head 12 by the tubing 30 in the manner hereinabove described for the field head 60. The reference head 12 and tabletop field head 160 are placed side by side on the surface to be leveled. The reference head reservoir 16 is then filled with liquid to a level corresponding to a mark on the datum scale on the tabletop field head. With the reference head 12 positioned on the work surface, for example at one corner thereof, the user moves the field head 160 to various locations around the work surface, for example the other corners, and raises or lowers each corner of the work surface until the level of the liquid in the plexiglass tube 166 corresponds to the selected reference mark on the datum scale 172. In this manner, one person can unassistedly level the work surface.

The datum scale 172 not only provides a reference point for determining when the work surface is level, but when the surface is not level also provides an accurate estimate of how far the work surface is out of level. If the datum scale 172 shows that the level of liquid in the plexiglass tube 166 is, for example, one-half inch below the selected reference mark, the user immediately knows that that point on the work surface is one-half inch too high, and that that point on the work surface must be lowered by one-half inch to bring it into level with the reference height defined by the reference head. Technically, the distance shown on the field head datum scale 172 is not exactly equal to the distance out of level, since any vertical movement of the field head 160 will result in a displacement of the liquid level at the reference head 12, thereby redefining the reference height. However, the distance by which a change in height at the field head 160 will displace the liquid level in the reference head 12 is proportional to the relative cross-sectional areas of the plexiglass tube 166 and the reference head reservoir 16. For example, the plexiglass tube 166 of the disclosed embodiment has an inner diameter of 0.25 inches and the reservoir 16 has an inner diameter of 2.5 inches. Their respective cross-sectional areas are thus proportional to the square of their diameters. Accordingly, the reservoir has a cross-sectional area one hundred times larger than the plexiglass tube, and a change in height of one inch at the field head will displace the liquid level at the reservoir by only 0.01 inch. Therefore, the datum scale 172 shows the vertical displacement of the work surface within accuracy of one percent. Acceptable accuracies of plus-or-minus five percent for determining distances out of level can be achieved with reservoirs having ratios of as little as twenty to one. However, it will be understood that these accuracies refer only to determining distances out of level, and that the instrument will always accurately show when the two elevations are exactly level regardless of the respective dimensions of the two reservoirs.

It will be appreciated that a variety of different embodiments of field heads can be employed with the reference head according to the particular application, for example, field heads having special attachment means or having special reference markings. For example, whenever practicable, the reference indicator should be attached at a height such that the reference mark on the reservoir is at the desired reference height. However, where obstructions, such as ceilings, make installation at that height impossible, the reference head may have to be installed below the desired level such that the liquid level defines a horizontal reference plane below the desired elevation, and the height on the object surface adjusted upwardly from the datum plane line accordingly. For such an application, a field head with a vertical ruler attachment which would reference a predetermined distance above the datum plane line could be employed.

Finally, it will be understood that the preferred embodiment of the present invention has been disclosed by way of example, and that other modifications may occur to those skilled in the art without departing from the scope and spirit of the appended claims.

What is claimed is:

1. An apparatus for establishing a horizontal plane on an object structure at a predetermined level corresponding to the bottom of a workpiece, comprising:

a housing;

means associated with said housing defining a first liquid reservoir;

means defining a second liquid reservoir, each of said first and second reservoirs being vented to the atmosphere and having a translucent portion such that the level of a liquid in said reservoirs is viewable through said translucent portion from outside said reservoirs;

attachment means associated with said housing for securing said housing to said workpiece;

a reference marking on said housing in visual juxtaposition with said translucent portion of said first reservoir and correlated with said attachment means to correspond to the bottom of said workpiece;

a reference marking on said second reservoir-defining means in visual juxtaposition with said translucent portion of said second reservoir;

liquid-conducting means for placing said first and second reservoirs in closed communication with each other; and means for introducing a quantity of liquid into said reservoirs and said liquid-conducting means sufficient to fill said liquid-conducting means and to fill said reservoirs to a level corresponding to their respective reference markings such that when the elevation of said second reservoir is adjusted relative to the object structure until the liquid level in said second reservoir corresponds to said reference mark associated therewith, said reference mark then corresponds on the object structure to said predetermined level corresponding to the bottom of said workpiece.

2. The apparatus of claim 1, further comprising a plurality of reference markings on said housing in visual juxtaposition with said translucent portion of said first reservoir, each of said markings being correlated with said attachment means to correspond to the bottom of a different workpiece to which said apparatus may be attached.

3. The apparatus of claim 1, wherein said means for introducing a quantity of liquid into said reservoirs and said liquid-conducting means comprises an aperture in the top of said first reservoir, and wherein said housing includes a flap having a plug disposed on the lower face of said flap and dimensioned to seal said aperture of said first reservoir, said flap being hingably mounted on the top of said housing such that said plug sealingly engages said aperture of said first reservoir when said flap is closed, whereby said first reservoir can be sealed for transport by closing said flap or vented by partially raising said flap until said plug disengages said aperture, and whereby liquid can be added to said reservoirs and said liquid-conducting means by fully raising said flap to reveal said aperture.

4. The apparatus of claim 1, wherein said second reservoir is vented to the atmosphere by means of an aperture in the top of said second reservoir, and further comprising a flap having a plug disposed on the lower face of said flap and dimensioned to seal said aperture of said second reservoir, said flap being hingably mounted in operative relation with said aperture in said second reservoir such that said plug sealingly engages said aperture of said second reservoir when said flap is closed, whereby said second reservoir can be sealed for transport by closing said flap or vented by partially raising said flap until said plug disengages said aperture.

5. The apparatus of claim 1, wherein said first reservoir has a cross-sectional area at least twenty times larger than the cross-sectional area of said second reservoir.

6. An apparatus for establishing a horizontal plane on an object structure at a predetermined level with respect to a reference structure, comprising:

means defining a first liquid reservoir vented to the atmosphere and having a translucent portion such that the level of a liquid in said first reservoir is viewable through said translucent portion from outside said first reservoir;

means associated with said first reservoir for securing said first reservoir to said reference structure;

a first reference marking in visual juxtaposition with said translucent portion of said first reservoir and correlated with said means for securing said first reservoir to said reference structure such that when said first reservoir is secured to said reference structure by said securing means said first reference marking corresponds to said predetermined level;

means defining a second liquid reservoir vented to the atmosphere and having a translucent portion such that the level of a liquid in said second reservoir is viewable through said translucent portion from outside said second reservoir;

a second reference marking in visual juxtaposition with said translucent portion of said second reservoir;

liquid-conducting means for placing said first and second reservoirs in closed communication with each other; and means for introducing a quantity of liquid into said reservoirs and said liquid-conducting means sufficient to fill said liquid-conducting means and to fill said reservoirs to a level corresponding to their respective reference markings such that when the elevation of said second reservoir is adjusted relative to said object structure until the liquid level in said second reservoir corresponds to said second reference mark, said second reference mark then corresponds to said predetermined level on said object structure.

7. The apparatus of claim 6, wherein said reference marking associated with said first liquid reservoir and correlated with said attachment means comprises a first reference marking, and wherein said means defining a first liquid reservoir includes a base at the lower end thereof for standing said first reservoir on a substantially horizontal surface, said apparatus further comprising a second reference marking in visual juxtaposition with said translucent portion of said first reservoir and correlated with said base.

* * * * *